(12) United States Patent
Martin et al.

(10) Patent No.: US 9,908,390 B2
(45) Date of Patent: Mar. 6, 2018

(54) COMPARTMENT DOOR SYSTEM WITH WATER MANAGEMENT FEATURE

(71) Applicant: LIPPERT COMPONENTS, INC., Elkhart, IN (US)

(72) Inventors: Dallas Martin, Sawyer, MI (US); David Wysong, Goshen, IN (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 0 days.

(21) Appl. No.: 14/954,005

(22) Filed: Nov. 30, 2015

(65) Prior Publication Data

US 2016/0153227 A1     Jun. 2, 2016

Related U.S. Application Data

(60) Provisional application No. 62/085,918, filed on Dec. 1, 2014.

(51) Int. Cl.
| | |
|---|---|
| *B60J 5/04* | (2006.01) |
| *E06B 7/23* | (2006.01) |
| *E06B 7/232* | (2006.01) |
| *E06B 7/22* | (2006.01) |

(52) U.S. Cl.
CPC .......... *B60J 5/0498* (2013.01); *B60J 5/0418* (2013.01); *B60J 5/0491* (2013.01); *E06B 7/22* (2013.01); *E06B 7/232* (2013.01); *E06B 7/2305* (2013.01); *E06B 7/2312* (2013.01)

(58) Field of Classification Search
CPC .... B60J 5/0498; B60J 5/0491; B60J 10/0045; B60J 5/0418

USPC .......... 49/495.1, 476.1, 400, 401; 114/201 R
See application file for complete search history.

(56) References Cited

U.S. PATENT DOCUMENTS

| | | | | |
|---|---|---|---|---|
| 1,576,461 | A * | 3/1926 | Polachek | E06B 3/12 49/401 |
| 3,221,376 | A * | 12/1965 | Smeltzer | E06B 5/20 49/482.1 |
| 3,566,539 | A * | 3/1971 | Ridgley | E05D 5/0223 16/382 |
| 4,179,849 | A * | 12/1979 | Kuffner | E06B 1/20 49/505 |
| 4,385,580 | A * | 5/1983 | Davidson | E06B 5/01 114/201 R |
| 4,809,469 | A * | 3/1989 | Klein | E06B 1/6046 49/394 |
| 5,222,287 | A * | 6/1993 | Cooper | B60J 5/0491 29/401.1 |
| 6,029,411 | A * | 2/2000 | Richardson | A47F 3/043 49/501 |
| 6,122,869 | A * | 9/2000 | Richardson | A47F 3/043 52/204.7 |

(Continued)

*Primary Examiner* — Katherine W Mitchell
*Assistant Examiner* — Marcus Menezes
(74) *Attorney, Agent, or Firm* — Barnes & Thornburg LLP

(57) ABSTRACT

A door system includes a door panel and a door panel frame. The door panel frame includes a peripheral web, an outer flange extending outwardly from the web, a seal flange extending inwardly from the web, and a guard flange extending inwardly from the web. The seal flange is outboard of the guard flange. Lower portions of the seal flange may include perforations there through to allow water that may accumulate between the seal flange and the guard flange to exit the frame outwardly.

18 Claims, 3 Drawing Sheets

(56) References Cited

U.S. PATENT DOCUMENTS

| | | | | |
|---|---|---|---|---|
| 6,334,277 B1* | 1/2002 | Condino | ................ | B60P 3/36 |
| | | | | 16/256 |
| 6,672,021 B2* | 1/2004 | Kusano | ................ | E05D 7/02 |
| | | | | 49/380 |
| 7,004,096 B1* | 2/2006 | Beal | ................ | B63B 19/14 |
| | | | | 114/201 R |
| 8,646,210 B2* | 2/2014 | Mauriac | ................ | B63B 19/00 |
| | | | | 114/202 |
| 2014/0069019 A1* | 3/2014 | Back | ................ | E06B 7/22 |
| | | | | 49/484.1 |
| 2016/0123053 A1* | 5/2016 | Martin | ................ | E06B 3/34 |
| | | | | 49/398 |

* cited by examiner

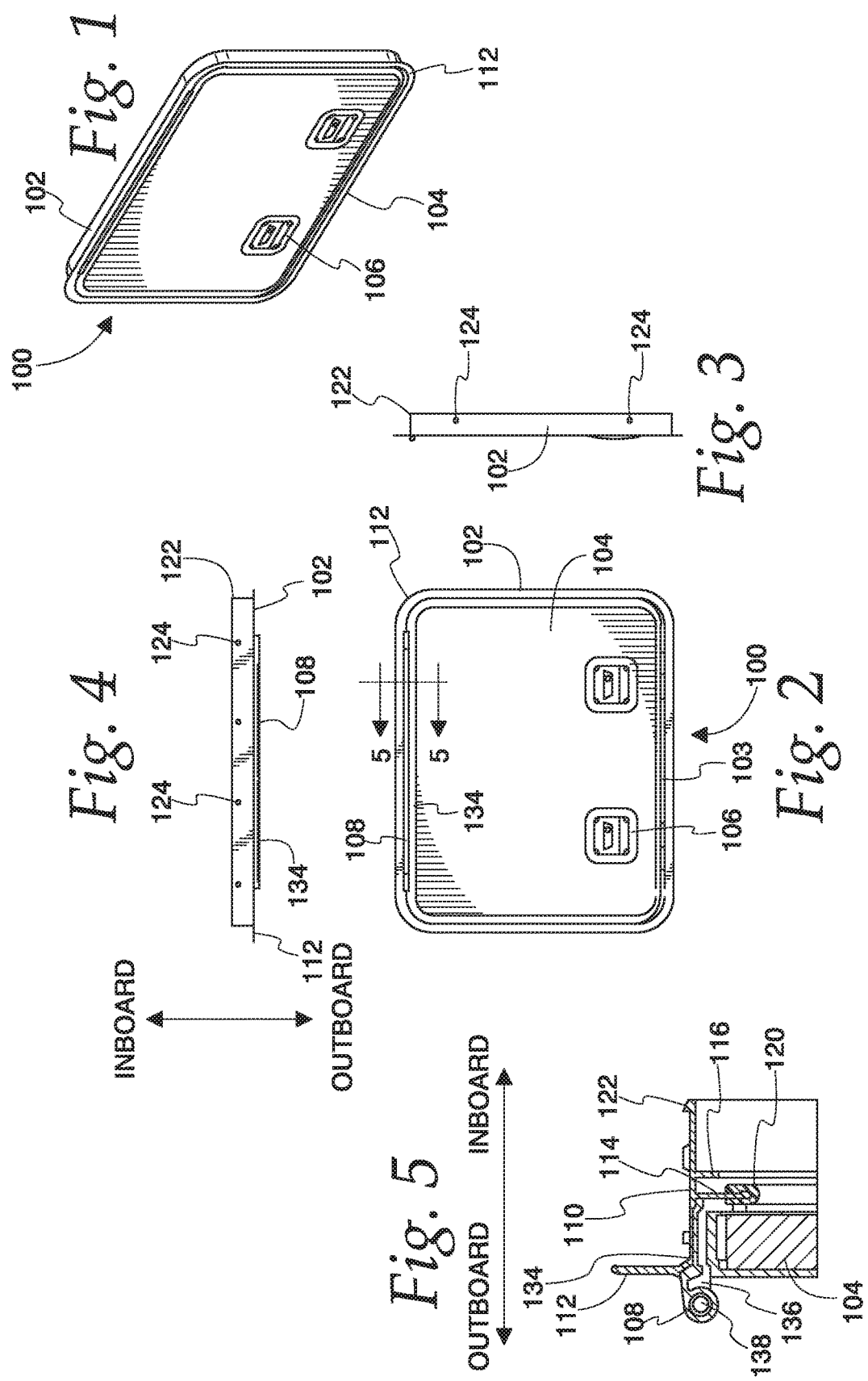

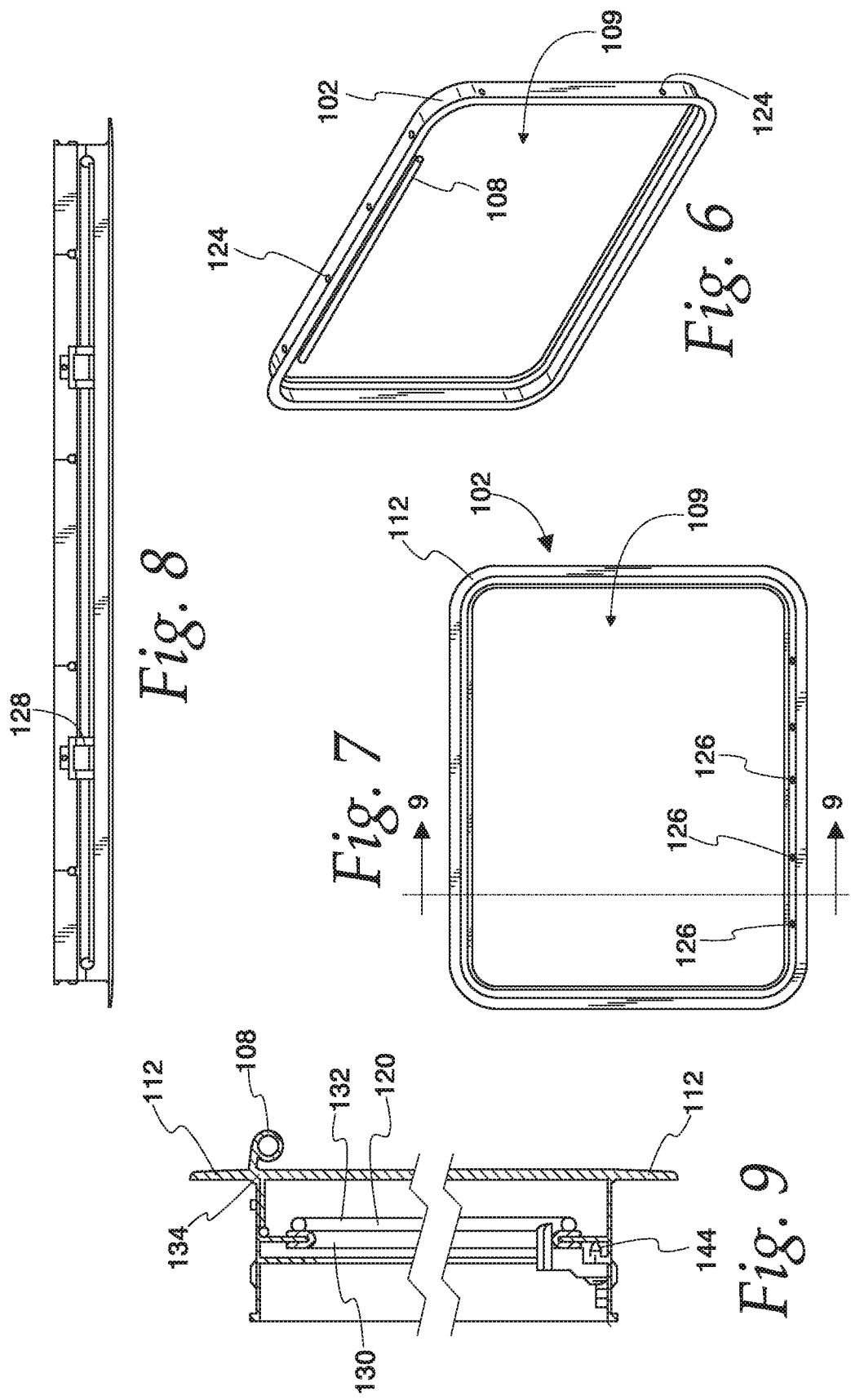

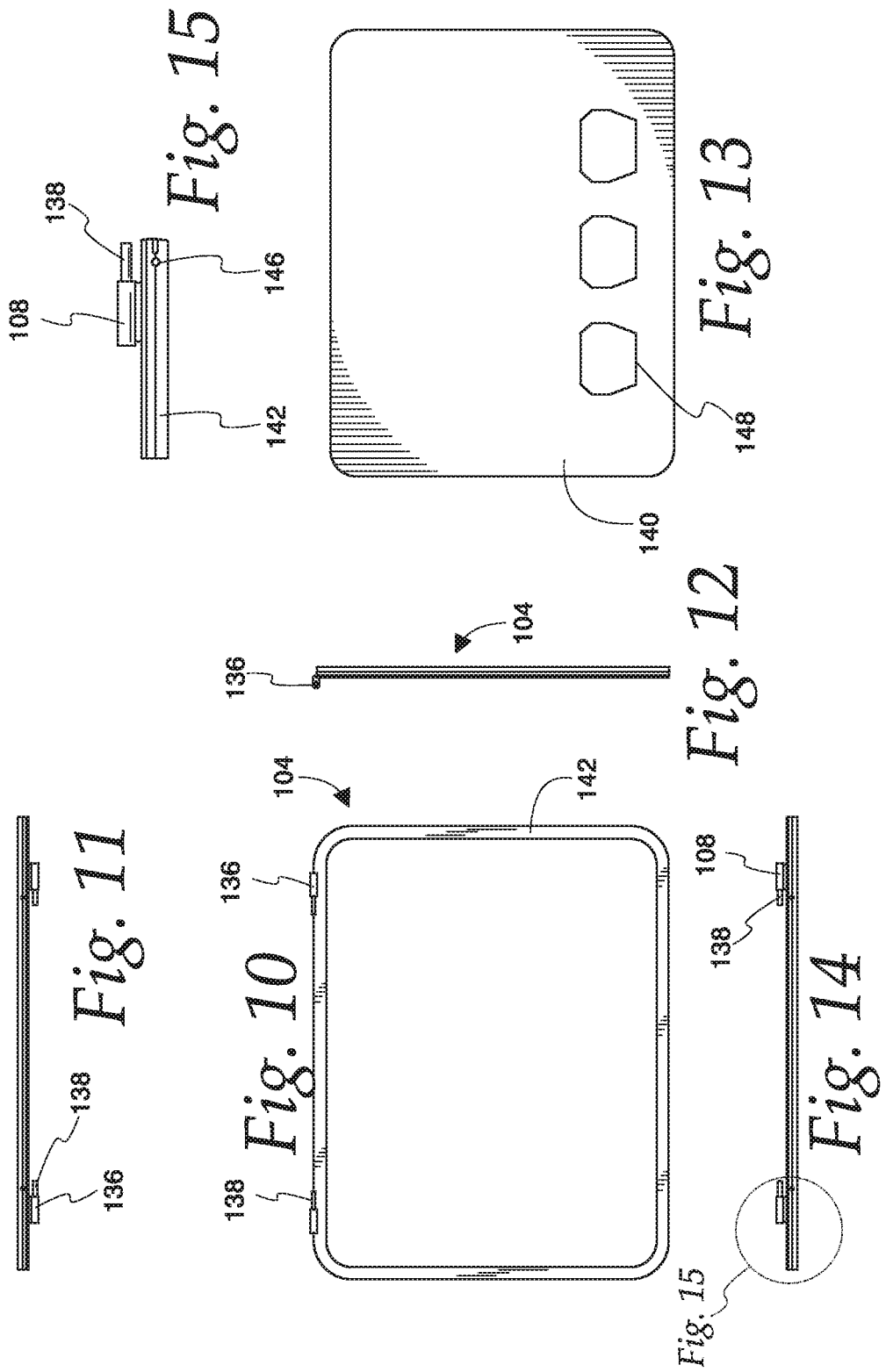

COMPARTMENT DOOR SYSTEM WITH WATER MANAGEMENT FEATURE

CROSS-REFERENCE TO RELATED APPLICATIONS

This application claims benefit of U.S. Provisional Patent Application No. 62/085,918, filed on Dec. 1, 2014, and incorporates by reference the disclosure thereof in its entirety.

BACKGROUND OF THE DISCLOSURE

Recreational vehicle, buses, and the like, often include compartments accessible from outside the vehicle. The compartments may be used to store baggage or enclose vehicle equipment, for example, outdoor kitchens, outdoor televisions, and other mechanical and electrical equipment. A door typically is provided to secure the compartment's contents and to provide protection from the elements. The door typically is top-hinged. The door typically is provided with a form of seal to preclude the intrusion of moisture and other contaminants when the door is closed. As a practical matter, however, moisture often finds its way into the compartment when the door is opened. For example, if a top-hinged door is opened while it is raining, rain water flowing down the side of the vehicle may find its way past the hinge assembly and onto the inner surface of the door. When the door is then closed, the water may flow down the inner surface of the door and may collect on the compartment floor. This phenomenon cannot readily be precluded with a seal because the seal necessarily is broken when the door is open.

SUMMARY OF THE DISCLOSURE

The disclosure shows and describes one or more illustrative embodiments of a compartment door system configured to manage water intrusion.

BRIEF DESCRIPTION OF THE DRAWINGS

FIG. 1 is a perspective view of an illustrative door system including a door frame and a door panel;

FIG. 2 is a front elevation view of the door system of FIG. 1;

FIG. 3 is a side elevation view of the door system of FIG. 1;

FIG. 4 is a top elevation view of the door system of FIG. 1;

FIG. 5 is a sectional end view of a portion of the door system of FIG. 1;

FIG. 6 is a perspective view of the door frame of FIG. 1;

FIG. 7 is a front elevation view of the door frame of FIG. 1;

FIG. 8 is a sectional plan view of the door frame of FIG. 1;

FIG. 9 is a sectional side view of the door system of FIG. 1;

FIG. 10 is a front elevation view of the door panel of FIG. 1;

FIG. 11 is a top plan view of the door panel of FIG. 1;

FIG. 12 is a side elevation view of the door panel of FIG. 1;

FIG. 13 is a front elevation view of an illustrative door panel core;

FIG. 14 is a bottom plan view of the door panel of FIG. 1; and

FIG. 15 is detail view of a portion of the door panel of FIG. 1.

DETAILED DESCRIPTION OF THE DRAWINGS

The drawings show an illustrative embodiment of a door system 100 structured to mitigate water intrusion. The system 100 includes a door frame 102, a door panel 104, a hinge 108 pivotally connecting the door panel to the door frame and one or more latches 106 for selectively securing the door panel to the door frame when the door panel is in the closed position.

As shown, the door frame 102 includes a continuous, generally rectangular, peripheral web 110 having a bottom (or first) side, a top (or second) side, a left (or third) side, and a right (or fourth) side (sometimes referred to, respectively, as header, sill, and right and left jamb portions of the door frame) cooperating to define an opening 109 there through. In other embodiments, the door frame and web could have other shapes, including non-rectangular shapes. The web 110 has an outer or outboard (or first) end and an inner or inboard (or second) end. The web 110 is dimensioned to fit into a correspondingly-shaped opening in a side wall of a structure (not shown), for example, the side wall of a recreational vehicle or bus. Any or all of the bottom, top, left, and right sides of the web 110 may define one or more apertures 124 configured to receive fasteners that may be used to secure the door frame 102 to the side wall of the structure.

An outer (or first) flange 112 extends outwardly (away from the opening 109) from the web 110 proximate the outer end thereof. The outer flange 112 is generally perpendicular to the web 110. The outer flange 112 is configured to engage the outer surface of the sidewall of the structure when the door frame 102 is connected thereto. A seal (not shown) may be provided between the outer flange 112 and the sidewall. A lip 122 extends outwardly from the web 110 proximate an inner end thereof. The lip 122 may engage the inner surface of the sidewall of the structure when the door frame 102 is connected thereto.

A seal (or second) flange 114 extends inwardly (toward the opening 109) from an intermediate portion of the web 110 between the outer and inner ends thereof. The seal flange 114 is generally perpendicular to the web 110. The seal flange 114 is shown as a continuous peripheral flange extending about the entirety of the interior surface of the web 110. The portion of the seal flange 114 extending from the bottom portion of the web defines one or more perforations 126 there through. The perforations 126 may abut the interface between the seal flange 114 and the web 110, or they could be distanced therefrom. The upper, left side, and right side portions of the seal flange 114 are shown as imperforate, but any or all of them could define one or more perforations similar to perforations 126 there through.

In an embodiment, the seal flange 114 could be discontinuous. For example, the portion of the seal flange extending from the bottom side of the web could include one or more discontinuities configured to allow passage of water there through. In such an embodiment, the perforations 126 could be omitted.

A guard (or third) flange 116 extends inwardly from an intermediate portion of the web 110, inboard of the seal flange 114. That is, the guard flange extends from an intermediate portion of the web 110 between the seal flange 114 and the inner end of the web. The guard flange 116 also is generally perpendicular to the web 110 such that the guard flange and the seal flange 114 are generally parallel to each other. The seal flange 114 and the guard flange 116 cooperate to form a channel or trough 144 there between. The seal flange 114 is shown as being longer (extending further inwardly) than the guard flange 116. In other embodiments, the seal flange 114 and the guard flange 116 could be the same length, or the guard flange could be longer than the seal flange.

The guard flange 116 also is shown as an imperforate, continuous, peripheral flange extending about the entirety of the interior surface of the web 110. In an embodiment, the guard flange could be discontinuous and/or define one or more perforations (not shown) there through. Any discontinuity or perforation in the portion of the guard flange 116 extending from the bottom side of the web 110 preferably would be covered or filled with a material suitable to preclude fluid communication through such discontinuity or perforation.

A seal 120 is attached to the seal flange 114 with a sealing surface facing outwardly, toward the outer end of the web. The seal 120 may comprise, for example, a U-shaped mounting portion 130 configured to receive the seal flange 114 within the "U" thereof, and a bulb seal portion 132 on the outboard side of the mounting portion. The seal 120 may be compressed between the door panel 104 and the seal flange 114 when the door panel is in the closed position.

The hinge 108 includes a first leaf 134 attached to an inner surface of an upper portion of the web 110, outboard of the seal flange 114. The hinge 108 also includes a second leaf 136 attached to the door panel 104. The hinge 108 further includes a hinge pin 138 pivotally connecting the first leaf 134 and the second leaf 136. The hinge pin 138 may be integral with one of the first leaf 134 and the second leaf 136, or the hinge pin may be a discrete structure.

The door panel 104 is shown as comprising a core 140 disposed within a peripheral door panel frame 142. The door panel 104 could be configured in other ways as well. The door panel 104 is pivotally connected to the door frame 102 via hinge 108, as discussed above. So connected, an outer surface of the door panel 104 may be generally flush with the outer flange 112 of the door frame 102 when the door panel is in a closed position. Also, an inner surface of the door panel 104 may engage with the seal 120 when the door panel is in the closed position. As such, the door panel 104, when in the closed position, may be substantially contained within the door frame 102. The door panel 104 may define one or more sites 148 for receiving the latch(es) 106. The sites 148 may comprise apertures extending through the door panel 104, for example, through the core 140 of the door panel. Alternatively, the sites 148 may define locations on the door panel 104 where the latch(es) 106 may be surface-mounted thereto.

The door frame 102 may be fabricated as an extrusion. The extrusion may be bent to form a desired frame size and shape. In the illustrated embodiment, the ends of the door frame extrusion are spliced together at about the midpoint of the top portion of the frame. The free ends of the door frame extrusion abutting the splice may be maintained in position solely by attachment of the first hinge leaf to the upper portion of the frame. Alternatively, the free ends of the door frame extrusion abutting the splice could be welded, bonded, or otherwise joined together, for example, by mechanical means.

The door panel frame 142 also may be fabricated as an extrusion. The extrusion may be bent to form a desired frame size and shape. The size and shape typically would be complementary to the size and shape of the door panel core 140 and the door frame 102. In the illustrated embodiment, the ends of the door panel frame extrusion are spliced together at about the midpoint of the bottom portion of the door panel frame 142. The free ends of the door panel frame 142 abutting the splice may be, but need not be, welded, bonded, or otherwise joined together, for example, by mechanical means. In the illustrated embodiment, the side of the door panel frame 142 abutting the bottom of the door frame 102 defines weep holes in the form of perforations 146 there through.

In use, the door panel 104 may be opened to allow access to the compartment it covers. When the door panel 104 is in an open (or second) position, water running down the outer surface of the wall in which the door system 100 is installed may find its way, whether through surface tension, splashing or another modality, to the inner surface of the door panel 104. When the door panel 104 is closed, this water may flow or otherwise migrate to the bottom of the inner surface of the door panel and then into the channel 144 defined by the seal flange 114 and the guard flange 116. The seal flange 114 and the guard flange 116 are arranged to preclude or mitigate migration of the water to the inboard side of the guard flange. The water then may exit the channel 144 through the perforations 126 in the seal flange 114 to the outboard side of the door frame 102. With the door panel 104 in the closed position, a gap 103 exists between the outer perimeter of the door panel 104 and the inner perimeter of the door frame 102 (that is, the inner surface of the web 110), so that the water may flow out of the door frame to the environment. In this manner, the system 100 may mitigate the effects of water intrusion into the door assembly 100.

The sill or bottom portion of the web 110 (or a portion thereof) could be angled or flared downwardly to the outboard side thereof so that the water exiting the perforations 126 may have a downhill path toward the outer edge of the web and the door frame 102 generally to preclude or mitigate water from ponding on the web or in the channel 144.

References to direction and orientation herein are to be construed in a relative, and not necessarily absolute, sense.

The embodiments shown and described herein are illustrative and may be modified without departure from the scope of the appended claims.

The invention claimed is:

1. A system comprising:
 a door frame defining an opening there through, said door frame comprising:
  a peripheral web having a first end and a second end;
  a first flange extending from said web proximate said first end of said web in a direction outward from said opening;
  a second flange extending from said web in a direction inward toward said opening, said second flange defining a perforation entirely there through; and
  a third flange connected directly to and extending from said web, said second flange extending from said web between said first flange and said third flange;
  wherein the web, the first flange, the second flange, and the third flange are monolithically formed; and
 a door panel pivotally connected to said door frame proximate said first end of said web and distant from said second end of said web, said door panel movable between a first position wherein said door panel covers said opening and at least a portion of said second flange, and a second position wherein said door panel substantially does not cover said opening and said second flange, wherein said second flange extends from said web between said door panel and said third flange when said door panel is in the first position.

2. The system of claim 1 further comprising a seal attached to said second flange such that said seal does not overlie said perforation, said seal compressed between said door panel and said second flange when said door panel is in said first position.

3. The system of claim 2,
said web further comprising:
  a first side;
  a second side spaced from and parallel to said first side;
  a third side connecting a first end of said first side to a first end of said second side; and
  a fourth side spaced from and parallel to said third side, said fourth side connecting a second end of said first side with a second end of said second side;
said second flange having a first side contiguous with said first side of said web, said perforation defined by said first side of said second flange proximate said web; and
said door panel pivotally connected to said door frame proximate said second side of said web.

4. The system of claim 3, said second flange further comprising:
  a second side contiguous with said second side of said web;
  a third side contiguous with said third side of said web; and
  a fourth side contiguous with said fourth side of said web.

5. The system of claim 4 wherein said second, said third, and said fourth sides of said second flange are imperforate.

6. The system of claim 5,
said third flange comprising an imperforate first side contiguous with said first side of said web.

7. The system of claim 6, said third flange further comprising:
  a second side contiguous with said second side of said web;
  a third side contiguous with said third side of said web; and
  a fourth side contiguous with said fourth side of said web.

8. The system of claim 7 wherein at least one of said second, said third, and said fourth sides of said third flange is imperforate.

9. The system of claim 3, said door frame and said door panel cooperating to define a gap between said first side of said web and said door panel when said door panel is in said first position, said gap in fluid communication with said perforation.

10. The system of claim 3 further comprising a hinge having a first leaf attached to said door frame and a second leaf attached to said door panel.

11. The system of claim 10, said first leaf comprising a pin receptacle and said second leaf comprising a pin.

12. The system of claim 4 wherein said first side of said web comprises a bottom side, said second side of said web comprises a top side, said third side of said web comprises a left jamb, and said fourth side comprises a right jamb.

13. The system of claim 1, said door panel comprises a core having a peripheral edge and a frame disposed about said peripheral edge.

14. The system of claim 1 disposed within an opening of a wall of a structure.

15. The system of claim 14 wherein said structure is a vehicle.

16. The system of claim 1 wherein said door panel is disposed substantially within said web when said door panel is in said first position.

17. The system of claim 1 further comprising a latch mechanism attached to said door panel and operable to selectively secure said door panel to said door frame when said door panel is in said first position.

18. The system of claim 1, the third flange extending from said web in a direction inward toward said opening.

* * * * *